(12) United States Patent
Whitney et al.

(10) Patent No.: US 8,364,373 B2
(45) Date of Patent: Jan. 29, 2013

(54) METHOD FOR CONTROLLING INTERNAL COMBUSTION ENGINES IN HYBRID POWERTRAINS

(75) Inventors: Christopher E. Whitney, Commerce, MI (US); Jeffrey M. Kaiser, Highland, MI (US); Dennis A. Light, Monroe, MI (US); Anthony H. Heap, Ann Arbor, MI (US); Honghao Tan, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 347 days.

(21) Appl. No.: 12/870,879

(22) Filed: Aug. 30, 2010

(65) Prior Publication Data

US 2012/0053765 A1    Mar. 1, 2012

(51) Int. Cl.
*G06F 17/00* (2006.01)
(52) U.S. Cl. ............... 701/85; 701/22; 701/54; 701/84; 701/102; 180/65.285
(58) Field of Classification Search ............ 701/22, 701/54, 84, 85, 102; 180/65.28, 65.285
See application file for complete search history.

(56) References Cited

U.S. PATENT DOCUMENTS

| | | | |
|---|---|---|---|
| 4,893,526 A * | 1/1990 | Tokoro | 477/43 |
| 6,553,958 B1 * | 4/2003 | Kolmanovsky et al. | 123/295 |
| 6,705,285 B2 * | 3/2004 | Yip et al. | 123/350 |
| 7,698,049 B2 * | 4/2010 | Whitney et al. | 701/103 |
| 8,122,986 B2 * | 2/2012 | Colvin et al. | 180/65.285 |
| 2001/0037793 A1 * | 11/2001 | Robichaux et al. | 123/339.19 |
| 2002/0117339 A1 * | 8/2002 | Nakashima | 180/65.4 |
| 2003/0075147 A1 * | 4/2003 | Kowatari et al. | 123/399 |
| 2005/0274357 A1 * | 12/2005 | Matthews et al. | 123/350 |
| 2009/0292452 A1 * | 11/2009 | Nishimura et al. | 701/106 |
| 2012/0029787 A1 * | 2/2012 | Whitney et al. | 701/102 |
| 2012/0065864 A1 * | 3/2012 | Whitney et al. | 701/102 |

\* cited by examiner

*Primary Examiner* — Joseph C Rodriguez
(74) *Attorney, Agent, or Firm* — Quinn Law Group, PLLC

(57) ABSTRACT

A method of operating a hybrid powertrain having an internal combustion engine monitors a throttle intake pressure and calculates a first torque capacity from a pressure model using the throttle intake pressure as an input. The method determines a maximum expected air mass from the monitored throttle intake pressure and calculates a second torque capacity from an air mass model using the maximum expected air mass volume as an input. The method calculates a final torque capacity as a function of the first torque capacity and the second torque capacity, and sends the final torque capacity to the hybrid control processor. An engine control module receives a torque request calculated as a function of the final torque capacity. A manifold pressure request is calculated as a function of the torque request, and a throttle is actuated as a function of the manifold pressure request.

10 Claims, 2 Drawing Sheets

METHOD FOR CONTROLLING INTERNAL COMBUSTION ENGINES IN HYBRID POWERTRAINS

TECHNICAL FIELD

This disclosure relates to methods for estimating and controlling torque in internal combustion engines of hybrid vehicles.

BACKGROUND

Motorized vehicles include a powertrain operable to propel the vehicle and power the onboard vehicle electronics. The powertrain, or drivetrain, generally includes an engine that powers the final drive system through a multi-speed power transmission. Many vehicles are powered by a reciprocating-piston-type internal combustion engine (ICE). The internal combustion engine converts chemical energy stored in fuel (gasoline, diesel, bio fuels, natural gas, or other fuels) into kinetic energy through combustion of the fuel mixed with air.

Hybrid vehicles utilize multiple, alternative power sources to propel the vehicle, minimizing reliance on the engine for power. A hybrid electric vehicle (HEV), for example, incorporates both electric energy and chemical energy, and converts the same into mechanical power to propel the vehicle and power the vehicle systems. The HEV generally employs one or more electric machines (motor/generators) that operate individually or in concert with the internal combustion engine to propel the vehicle. The electric machines convert kinetic energy into electric energy which may be stored in an energy storage device. The electric energy from the energy storage device may also be converted back into kinetic energy for propulsion of the vehicle.

SUMMARY

A method of operating a hybrid powertrain controlled by a hybrid control processor is provided. The hybrid powertrain has an internal combustion engine with a throttle and is controlled by an engine control module. The method includes monitoring a throttle intake pressure and calculating a first torque capacity from a pressure model. The monitored throttle intake pressure is an input to the pressure model. The method also includes determining a maximum expected air mass from the monitored throttle intake pressure and calculating a second torque capacity from an air mass model. The maximum expected air mass volume is an input to the air mass model. The method further includes calculating a final torque capacity as a function of the first torque capacity and the second torque capacity, and sending the final torque capacity to the hybrid control processor.

The method may include receiving a torque request—which is calculated as a function of the final torque capacity—from the hybrid control processor, and calculating a manifold pressure request with the engine control module as a function of the torque request from the hybrid control processor. The method then includes actuating the throttle as a function of the manifold pressure request.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figure 1:
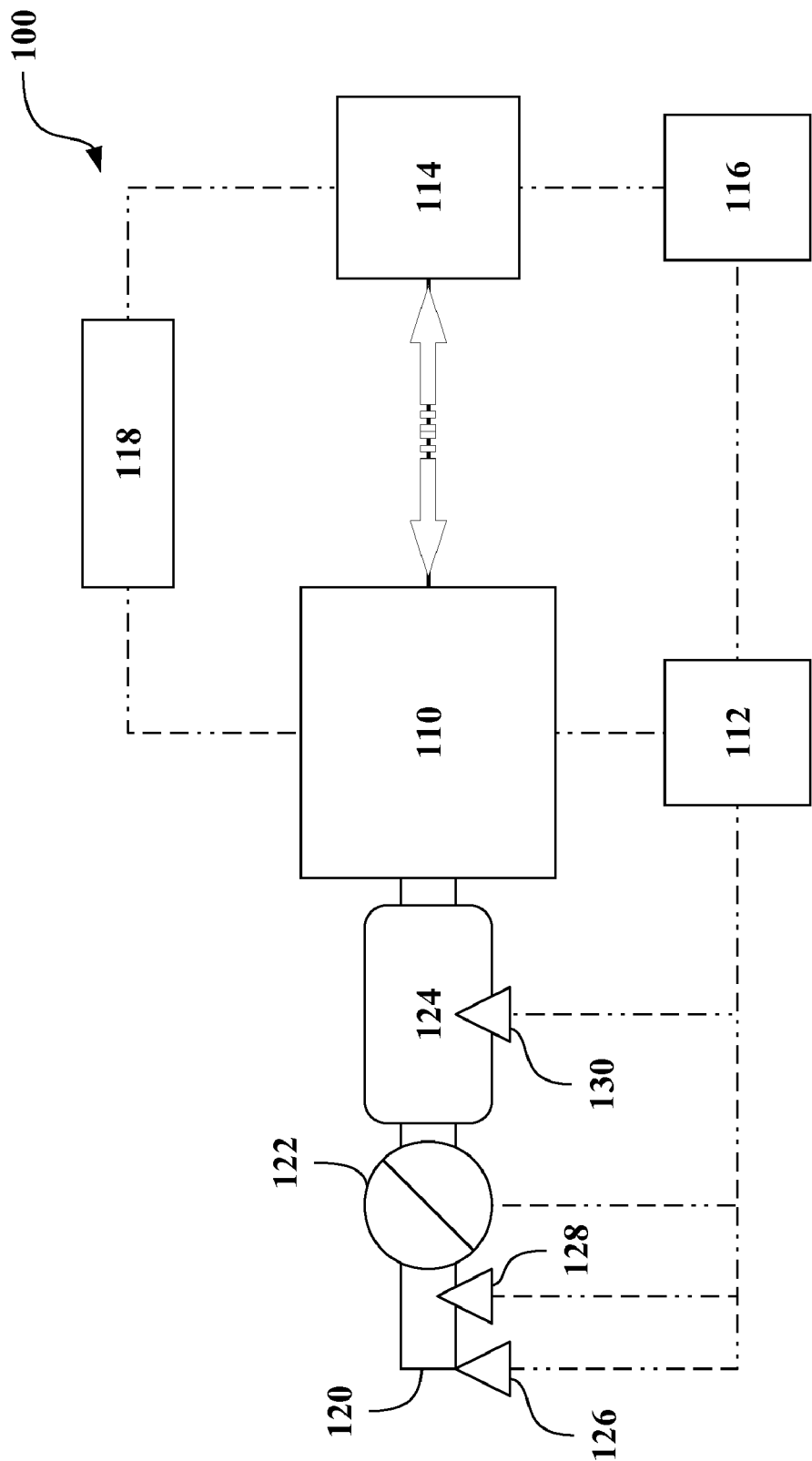
FIG. 1 is a schematic diagram of a hybrid powertrain.

Referring to the drawings, wherein like reference numbers correspond to like or similar components throughout the several figures, there is shown in FIG. 1 a schematic diagram of a hybrid powertrain 100 for a hybrid vehicle. The hybrid powertrain 100 includes an internal combustion engine 110, which is controlled by an engine control module 112 (or ECM 112), and an electric machine 114, which is controlled by a hybrid control processor 116 (or HCP 116). The engine 110 and electric machine 114 are the primary movers for the hybrid vehicle and are in power-flow communication with each other and with a final drive (not shown) of the hybrid powertrain. The engine 110 and electric machine 114 combine to accelerate and decelerate the vehicle.

While the present invention is described in detail with respect to automotive applications, those skilled in the art will recognize the broader applicability of the invention. Those having ordinary skill in the art will recognize that terms such as "above," "below," "upward," "downward," et cetera, are used descriptively of the figures, and do not represent limitations on the scope of the invention, as defined by the appended claims. As used herein, the term hybrid vehicle refers generally to any vehicle configured with multiple power sources (such as the engine 110 and the electric machine 114) which may include alternative energy traction devices or primary movers.

The electric machine 114 is configured to convert kinetic energy into electric energy which may be stored in an energy storage device or battery 118. The electric energy from the battery 118 may then be converted back into kinetic energy for propulsion of the hybrid vehicle. The electric machine 114 may convert kinetic energy from the engine 110 or may assist the engine 110 in providing propulsion for the hybrid powertrain 100. The electric machine 114 may be an electric motor, an electric generator, a motor/generator, or any combination or amalgamation thereof.

The engine 110 is in communication with an air intake 120. Selective amounts of air are allowed to pass through the air intake 120 via a throttle 122, which is controlled directly or indirectly by the ECM 112. A manifold 124 is disposed between the throttle 122 and the engine 110, and the throttle 122 selectively and variably allows air into the manifold 124.

By varying the amount of air entering the engine 110, the throttle varies the combustion process and varies the power and torque output of the engine 110. The air is combined with fuel (gasoline, diesel, biodiesel, natural gas, et cetera) in the engine 110. In very general terms, and with many other variables fixed or ignored, more air allows more fuel to be combusted and more torque to be produced by the engine 110. Opening the throttle to its widest and least restrictive position allows the engine 110 to operate at its highest torque output, its maximum capacity.

A throttle intake pressure or throttle intake air pressure (TIAP) with an intake sensor 126 is in communication with the air intake 120. The intake sensor 126 generally measures the pressure of the ambient air entering the air intake 120.

An air mass sensor 128 measures airflow volume passing through the air intake 120. The air mass sensor 128 is shown disposed in front of the throttle 122, but may be located anywhere along the air intake 120.

A manifold air pressure sensor or MAP sensor 130 measures pressure within the manifold 124. The throttle 122 varies pressure within the manifold 124 by selectively restricting air flow into the manifold 124 from the intake. The throttle intake air pressure may also be a learned value derived using the MAP sensor 130 when the engine is not spinning and the manifold and intake pressures may be the same.

The ECM 112 uses inputs from some or all of the sensors 126, 128, and 130 to estimate or determine the torque capacity of the engine 110. The ECM 112 may send the determined torque capacity, and other measured or determined information, to the HCP 116. Then, the HCP 116 determines the amount of torque the engine 110 should supply to optimize operation of the hybrid powertrain 100. Generally, more accurate estimates of the torque capacity of the engine 110 allow more accurate optimization of the hybrid powertrain 100 by the HCP 116.

Figure 2:
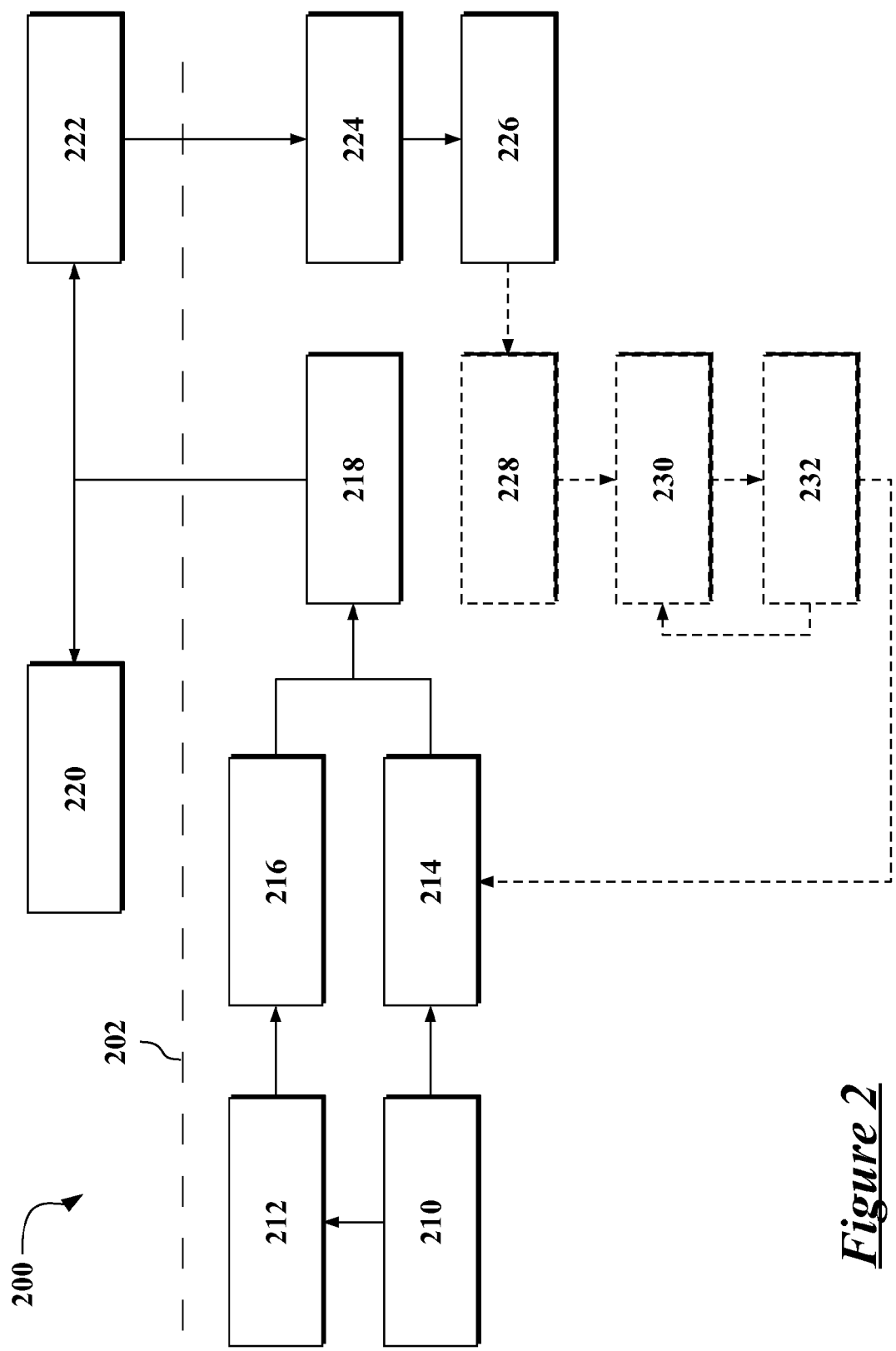
FIG. 2 is a schematic flow chart of an algorithm or method for controlling an internal combustion engine of a hybrid powertrain, such as that shown in FIG. 1.

Referring now to FIG. 2, and with continued reference to FIG. 1, there is shown a schematic flowchart of an algorithm or method 200 for controlling the engine 110. The method 200 may be used to determine the available maximum torque capacity for the engine 110 and also to control the engine 110 to, when required, produce the maximum torque capacity. Generally, steps shown below a line 202 of FIG. 2 are part of the operations of the ECM 112, and steps shown above the line 202 of FIG. 2 are part of the operations of the HCP 116. However, the relative location of steps above or below the line 202 is not limiting. Furthermore, a single controller may execute some or all of the functions of the ECM 112, the HCP 116, or both.

Step 210: Measure TIAP.

The method 200 monitors throttle intake air pressure (TIAP) with the intake sensor 126 at step 210. The TIAP measurement represents the maximum air available, at ambient pressure, to be drawn into the manifold 124 and the engine 110 for combustion.

Step 212: Determine Maximum Air Mass.

The method 200 converts the TIAP pressure measured by the intake sensor 126 to a maximum achievable air per cylinder (APC), or maximum expected air mass. The method 200 may determine the maximum expected air mass using a MAP-to-APC conversion that is typically done with volumetric efficiency models.

Step 214: MAP-to-Torque, Pressure Model.

The method 200 includes calculating a first torque capacity from a pressure model, the MAP-to-Torque model. The pressure model determines the torque capacity of the engine 110 as a function of the available air for combustion, and determines the available air from pressure readings.

The MAP-to-Torque model is derived based upon finding the torque available as a function of the manifold pressure, where higher pressure in the manifold 124 generally means that more air is available for combustion. However, the method 200 is utilizing the TIAP as an input to the function, as measured by the intake sensor 126. By calculating the first torque capacity based upon the pressure available opposite the throttle 122 from the manifold 124, the method 200 is calculating torque capacity based upon the maximum available air pressure. The method 200 is calculating torque capacity while assuming that the throttle 122 will be fully opened, such that the pressure in the manifold 124 equals the pressure in at the intake sensor 126.

Step 216: APC-to-Torque, Air Mass Model.

The method 200 similarly includes calculating a second torque capacity from an air mass model, the APC-to-Torque model. The APC-to-Torque model uses the maximum expected air mass calculated in step 212 as an input to the air mass model. Therefore, both the MAP-to-Torque model and APC-to-Torque model are calculating the first and second torque capacities, respectively, from the TIAP measured at the intake sensor 126, as if the throttle 122 is unrestricted.

The MAP-to-Torque model and APC-to-Torque model are separately used to calculate torque capacity. The outcome of the MAP-to-Torque and APC-to-Torque functions may be different or they may find the same torque capacity. The ECM 112 is not directly measuring torque output or capacity of the engine 110, these are estimates. The method 200 then proceeds to determine which of the torque capacity estimates should be used.

Step 218: Arbitrate to Determine Final Max Capacity.

The method 200 includes calculating a final torque capacity as a function of the first torque capacity (from the MAP-to-Torque model) and the second torque capacity (from the APC-to-Torque model). Depending upon the configuration of the hybrid powertrain 100 and the characteristics of the engine 110, numerous techniques may be used to determine the final torque capacity from the first and second torque capacities and other factors.

For example, and without limitation, if the goal of the method 200 is to provide the largest estimate of available torque capacity to the HCP 116, the ECM 112 may choose the larger of the capacity estimates. Therefore, the HCP 116 is likely to request either the actual maximum torque capacity or a greater amount. Either way, in that configuration, the hybrid powertrain 100 is using all available torque from the engine 110. Alternatively, the method 200 may not simply take the larger of the estimates, or the method 200 may favor the results of one model over the other.

The final torque capacity may alternatively be calculated as a function of a constraint factor applied to either the first torque capacity or the second torque capacity. The constraint factor may be a fixed value which limits the range of the one of the capacity estimates over the other. Furthermore, the method 200 may average, combine, or apply another statistical technique to the capacity estimates to determine the final torque capacity which will be sent to the HCP 116.

Another technique for determining the final torque capacity favors the APC-to-Torque model, which determines the second torque capacity. In such a configuration, the final torque capacity is determined by finding the maximum of: the second torque capacity; and the minimum of the first torque capacity, and the sum of the second torque capacity and the constraint factor. This calculation may be expressed by the formula: MAX [second torque capacity, MIN (first torque capacity, second torque capacity+constraint factor)].

Therefore, the final torque capacity will always be equal to the second torque capacity when the APC-to-Torque (air mass) model yields a higher torque capacity estimate. However, if the MAP-to-Torque (pressure) model yields a higher torque capacity estimate, the final torque capacity is constrained to the second torque capacity plus the value of the constraint factor. When the method 200 uses this technique, the APC-to-Torque model is favored, and the MAP-to-Torque model is allowed to increase the final torque capacity only by a calculated amount.

Step 220: HCP Determines Gear Ratio or Mode; Long-Term Optimization.

Once the final torque capacity has been determined by the ECM 112, the method 200 sends the final torque capacity to the HCP 116 for optimization of the hybrid powertrain 100 in light of the current and expected operating conditions of the hybrid vehicle. One of the functions performed by the HCP 116 is to determine the gear ratio or transmission mode. This is referred to as a long-term optimization because the HCP 116 attempts to choose a gear ratio which will satisfy the operating requirements of the driver for more than an instantaneous time frame.

Step 222: HCP Determines Engine Torque Request; Short-Term Optimization.

Another of the functions performed by the HCP 116 is to determine an engine torque request for operation of the engine 110 which will allow the hybrid powertrain 100 to meet, generally, the instantaneous operating conditions requested by the driver. This is referred to as a short-term optimization because the HCP 116 and the driver may quickly alter the amount of torque requested of the engine 110 or the hybrid powertrain 100 as a whole. The HCP 116 calculates the engine torque request as a function of the final torque capacity sent by the ECM 112.

In a strong hybrid, such as a multi-mode EVT hybrid vehicle, the driver's pedal commands are converted into an axle torque request and the HCP 116 determines the combined torque from the engine 110 and the electric machine 114 that are most-likely to satisfy the driver and other requirements for the hybrid powertrain 100. Similarly, in a mild hybrid, such as a belt-alternator-starter vehicle, the HCP 116 determines a crankshaft torque request and then determines the combined torque from the engine 110 and the electric machine 114 that are most-likely to satisfy the crankshaft torque request.

The torque request may come, in whole or part, from sources other than the driver. For example, and without limitation, cruise control or object avoidance systems may provide the torque request or alter the torque requested by the driver. Following short-term optimization, the engine torque request is sent back to the ECM 112 in order to control the engine 110 to the desired amount of torque.

Depending upon the configuration of the hybrid powertrain 100, and the relative capabilities of the prime movers (the engine 110 and the electric machines 114), the hybrid powertrain 100 may be configured such that the engine 110 regularly runs at its maximum torque capacity. In some internal combustion engines, the maximum capacity at the stoichiometric air-fuel mixture is the optimal fuel economy operating point because the engine is unthrottled. Therefore, when the engine 110 is running, the hybrid powertrain 100 may spend a large percentage of time with the engine 110 running at maximum torque capacity, requiring unthrottled operation.

Step 224: Inverse MAP-to-Torque.

In order to determine how to operate the throttle 122 to meet the torque requested of the engine 110 by the HCP 116, the method 200 converts the engine torque request back to a pressure value for the manifold 124. The method 200 calculates a manifold pressure request as a function of the engine torque request from the HCP 116. The manifold pressure request will then be used to control the throttle 122 and other actuators.

Calculating the manifold pressure request may include an inverse pressure model, or inverse MAP-to-Torque model, which may also be referred to as a torque-to-MAP model. The inverse pressure model is the reverse function or inverse function of the MAP-to-Torque pressure model used to calculate the first torque capacity. Therefore, if a value of MAP_1 is input into the MAP-to-Torque model and results in an output of Torque_1; when the Inverse MAP-to-Torque model takes Torque_1 as the input, the output will be MAP_1. Similarly, because step 214 used the TIAP measured by the intake sensor 126 to determine the first torque capacity, if the engine torque request from the HCP 116 is equal to the first torque capacity, the inverse MAP-to-Torque model will calculate the manifold pressure request to be equal to the TIAP in step 224. With an inverse function, the input of the MAP-to-torque function yields an output which, when put through the inverse MAP-to-Torque function will yield the input.

Alternatively, the method 200 may utilize an inverse APC-to-Torque model to calculate the position of the throttle 122, or both pressure and air mass values may be used to calculate the position of the throttle 122. The inverse APC-to-Torque model may also be used to determine the value of torque actuators other than the throttle 122.

Step 226: Control Torque Actuators.

After the manifold pressure request is calculated from the engine torque request sent by the HCP 116, the ECM 112 will control the throttle 122 and other torque actuators (fuel injectors, cam phasers, spark plugs, et cetera) to achieve the engine torque request as a function of the manifold pressure request. If the HCP 116 requested the maximum available torque from the engine 110, the throttle 122 would now be fully open, such that the TIAP measured with the intake sensor 126 and the manifold air pressure measured with the MAP sensor 130 will be substantially equal. This may be referred to as unrestricted flow, least restricted flow, or wide-open throttle 122.

The method 200 has now determined the final torque capacity by using multiple estimates of the torque available from the engine 110, sent that final torque capacity from the ECM 112 to the HCP 116 for optimization of the hybrid powertrain 110, sent the engine torque request back from the HCP 116 to the ECM 112, and actuated the throttle 122 to produce the engine torque request in the engine 110. The method 200 has ensured that the throttle 122 will be actuated to its least restricted state by calculating the first torque capacity with the TIAP. The method 200 may also include learning capabilities used alter either the MAP-to-Torque or the APC-to-Torque models.

Step 228: Monitor MAP and APC.

Steps 228, 230, and 232 schematically provide an illustrative technique for learning the MAP-to-Torque model to estimate torque capacity nearer to the estimate provided by the APC-to-Torque model. At step 228, the method 200 monitors airflow volume with the air mass sensor 128 and also monitors MAP with the MAP sensor 130. The manifold pressure measurement from the MAP sensor 130 may be used to calculate torque with the MAP-to-Torque model, and the air mass measurement from the air mass sensor 128 may be used to calculate the amount of air per cylinder (APC) used for combustion within the engine 110.

Step 230: Compare MAP-to-Torque and APC-to-Torque.

The method 200 compares the results of the MAP-to-Torque model with the results of the APC-to-Torque model. After the throttle 122 is actuated to its least restrictive position, the air mass sensor 128 measures the actual air flow to the engine 110 and the ECM 112 uses the APC-to-Torque model to calculate a first achieved torque. The ECM 112 also measures the manifold pressure (the MAP) and uses the MAP-to-Torque model with the current MAP to calculate a second achieved torque. The method 200 then compares the second achieved torque to the first achieved torque to determine whether the MAP-to-Torque model should be adjusted.

Step 232: Learning MAP-to-Torque.

If the second achieved torque is substantially different from the first achieved torque, the method 200 creates a learned pressure model. The new, learned pressure model is then used during subsequent iterations of the method 200. The learned pressure model replaces or updates the MAP-to-Torque model used in steps 214 and 230, and also adjusts the inverse MAP-to-Torque model used in step 224.

Subsequent calculations of the torque capacity from the MAP-to-Torque model and calculations of the requested MAP will result in values nearer to the coincident calculations of torque capacity from the APC-to-Torque model. This also results in subsequent calculations of torque capacity from the MAP-to-Torque model being closer to the estimated achieved torque, because achieved torque estimates will typically use the APC-to-Torque Model. Therefore, in steady-state operation, the estimates of torque capacity—from MAP-to-Torque in step 214 and from final torque arbitration in step 218—will be close to, or match, the estimated achieved torque calculated with the APC-to-Torque model in step 230.

The method 200 may also limit learning of the MAP-to-Torque model to results in which the MAP-to-Torque model yields a greater estimate of torque capacity than the APC-to-Torque model (i.e. single-direction learning). Steps 228-232 assume that the APC-to-Torque model is more accurate, but the method 200 could also include learning the APC-to-Torque model toward the MAP-to-Torque model, if that model were determined to be the more-accurate model.

For illustrative purposes, the method 200 is described with reference to many of the elements and components shown and described in relation to FIG. 1. However, other components may be used to practice the method 200 and the invention defined in the appended claims. The exact order of the steps of the algorithm or method 200 shown in FIG. 2 is not required. Steps may be reordered, steps may be omitted, and additional steps may be included.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A method of controlling an internal combustion engine for a hybrid vehicle, wherein the internal combustion engine has a throttle and is controlled by an engine control module, the method comprising:
monitoring a throttle intake pressure;
determining a maximum expected air mass from the monitored throttle intake pressure;
calculating a first torque capacity from a pressure model, wherein the throttle intake pressure is an input to the pressure model;
calculating a second torque capacity from an air mass model, wherein the maximum expected air mass is an input to the air mass model;
calculating a final torque capacity as a function of the first torque capacity and the second torque capacity;
calculating a manifold pressure request as a function of the final torque capacity; and
actuating the throttle as a function of the manifold pressure request.

2. The method of claim 1, wherein the final torque capacity is further calculated as a function of a constraint factor.

3. The method of claim 2, wherein calculating the manifold pressure request includes an inverse pressure model, wherein the inverse pressure model is the inverse function of the pressure model used to calculate the first torque capacity.

4. The method of claim 3, wherein calculating the final torque capacity is determined by finding the maximum of:
the second torque capacity; and
the minimum of:
the first torque capacity, and
the sum of the second torque capacity and the constraint factor.

5. A method of operating a hybrid powertrain controlled by a hybrid control processor, wherein the hybrid powertrain has an internal combustion engine with a throttle and is controlled by an engine control module, the method comprising:
monitoring a throttle intake pressure;
calculating a first torque capacity from a pressure model, wherein the monitored throttle intake pressure is an input to the pressure model;
determining a maximum expected air mass from the monitored throttle intake pressure;
calculating a second torque capacity from an air mass model, wherein the maximum expected air mass volume is an input to the air mass model;
calculating a final torque capacity as a function of the first torque capacity and the second torque capacity;
sending the final torque capacity to the hybrid control processor;
receiving a torque request from the hybrid control processor, wherein the torque request is calculated as a function of the final torque capacity;
calculating a manifold pressure request with the engine control module as a function of the torque request from the hybrid control processor; and
actuating the throttle as a function of the manifold pressure request.

6. The method of claim 5, wherein the final torque capacity is further calculated as a function of a constraint factor.

7. The method of claim 6, wherein calculating the manifold pressure request includes an inverse pressure model, wherein the inverse pressure model is the inverse function of the pressure model used to calculate the first torque capacity.

8. The method of claim 7, wherein calculating the final torque capacity is determined by finding the maximum of:
the second torque capacity; and
the minimum of:
the first torque capacity, and
the sum of the second torque capacity and the constraint factor.

9. The method of claim 8, further comprising:
monitoring an air mass;
calculating a first achieved torque from an air mass model as a function of the monitored air mass volume;
monitoring a manifold pressure;
calculating a second achieved torque from the pressure model as a function of the monitored manifold pressure;
comparing the first achieved torque to the second achieved torque;
if the first achieved torque is different than the second achieved torque, creating a learned pressure model;
calculating a third torque capacity from the learned pressure model, wherein the monitored throttle intake pressure is an input to the learned pressure model;
calculating a fourth torque capacity from the air mass model, wherein the maximum expected air mass is an input to the air mass model;
calculating a new final torque capacity as a function of the third torque capacity and the fourth torque capacity;
sending the new final torque capacity to the hybrid control processor;
receiving a new torque request from the hybrid control processor, wherein the new torque request is calculated as a function of the new final torque capacity;
calculating a new manifold pressure request with the engine control module as a function of the new torque request from the hybrid control processor; and
actuating the throttle as a function of the new manifold pressure request.

10. The method of claim 5, further comprising:

monitoring an air mass;

calculating a first achieved torque from an air mass model as a function of the monitored air mass volume;

monitoring a manifold pressure;

calculating a second achieved torque from the pressure model as a function of the monitored manifold pressure;

comparing the first achieved torque to the second achieved torque;

if the first achieved torque is different than the second achieved torque, creating a learned pressure model;

calculating a third torque capacity from the learned pressure model, wherein the monitored throttle intake pressure is an input to the learned pressure model;

calculating a fourth torque capacity from the air mass model, wherein the maximum expected air mass is an input to the air mass model;

calculating a new final torque capacity as a function of the third torque capacity and the fourth torque capacity;

sending the new final torque capacity to the hybrid control processor;

receiving a new torque request from the hybrid control processor, wherein the new torque request is calculated as a function of the new final torque capacity;

calculating a new manifold pressure request with the engine control module as a function of the new torque request from the hybrid control processor; and actuating the throttle as a function of the new manifold pressure request.

* * * * *